May 22, 1962 K. W. STALKER ETAL 3,035,463
MACHINE FOR FORMING WHEELS
Filed May 12, 1958 2 Sheets-Sheet 1
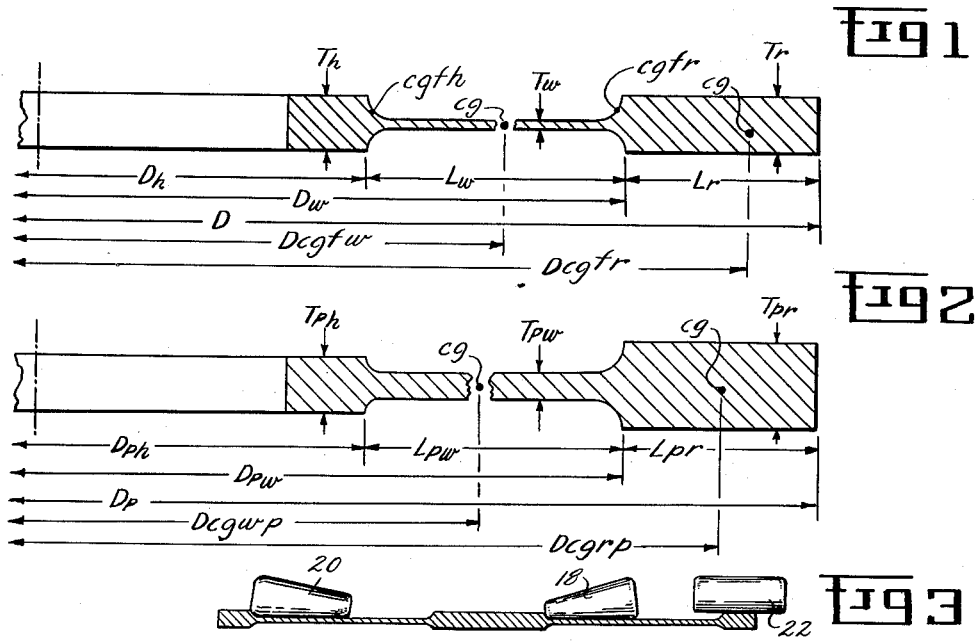
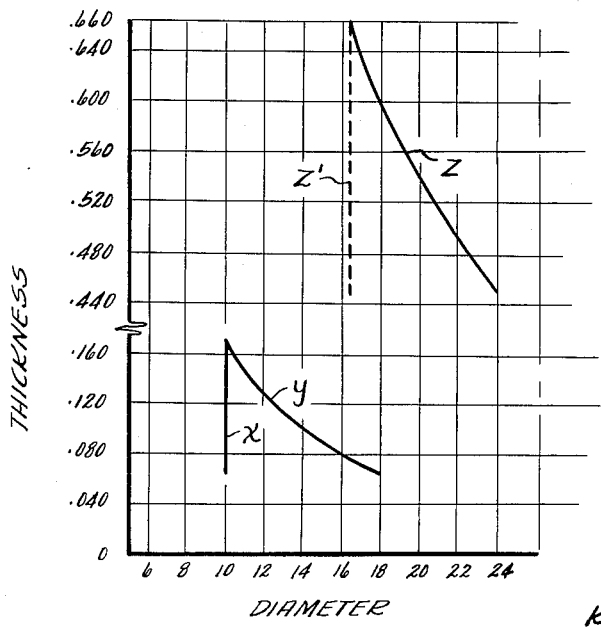
INVENTORS.
KENNETH W. STALKER
KURT R. STADTHAUS
BY
*Lee H Sachs*
THEIR ATTORNEY—

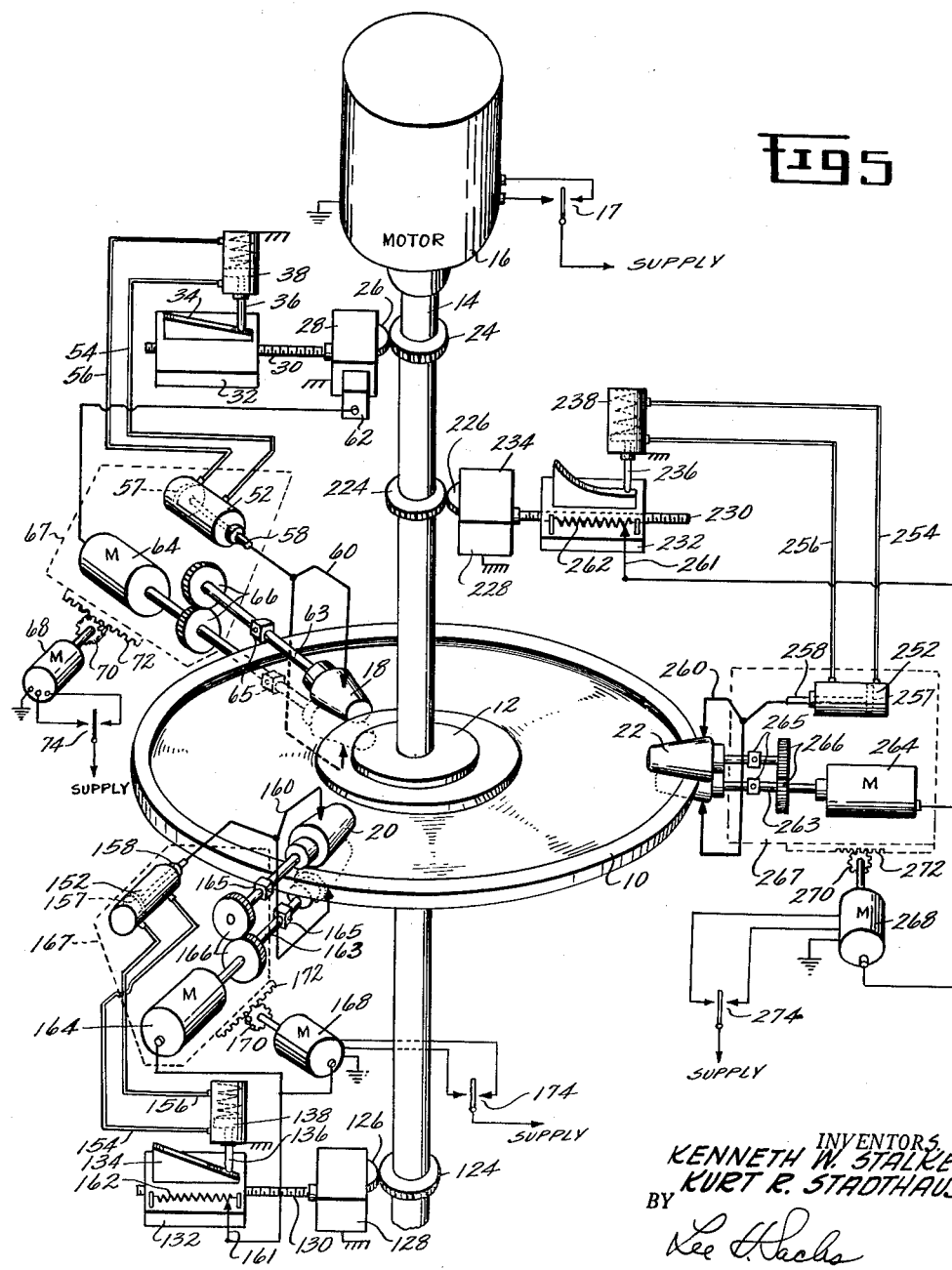

United States Patent Office 3,035,463
Patented May 22, 1962

3,035,463
MACHINE FOR FORMING WHEELS
Kenneth W. Stalker, Cincinnati, and Kurt R. Stadthaus, Madeira, Ohio, assignors to General Electric Company, a corporation of New York
Filed May 12, 1958, Ser. No. 734,672
6 Claims. (Cl. 80—16)

This application is a continuation in part of application Serial Number 453,628, filed September 1, 1954, now abandoned.

This invention relates to a machine for forming thin, contoured wheels by cold rolling, and, in particular to forming a flat thin contoured wheel by programming the rate of reduction of thickness of one portion of the wheel with respect to the rate of reduction in thickness of another portion of the wheel.

In aircraft gas turbines, weight considerations play an important part in obtaining as much thrust as possible per pound of engine. A saving of one pound of engine weight while retaining the same thrust results in an increase in the aircraft payload of about ten pounds. Since a large number of wheels are used in the compressor and turbine of a gas turbine engine, weight savings can be realized if the wheels can be fabricated to a thinner dimension than presently capable by known methods. Engine designers have found that wheels of an axial flow compressor and turbine are thicker than required to withstand the loads during engine operation. However, fabrication methods of forming wheels have not progressed to the point where they can be machined or formed to these allowable designed dimensions for the wheels.

Previous methods for forming thin contoured wheels have been attempted, but the results have not proven satisfactory. For example, the wheels of gas turbine machines are presently machined to their final dimensions. Conventional machining processes have not been perfected sufficiently to machine thin wheels down to allowable design thickness for use in turbomachines. Conventional machining processes can reduce the thickness to a neighborhood of .20" without difficulty. Machining below this thickness creates warping or dishing because of tool pressure and unequal stresses. However, as pointed out above, this dimension is far greater than the allowable design thickness. For example, in some instances .03" to .06" has been found to be sufficient in thickness to withstand the design loads. Accordingly, it has not been found to be economically possible to machine wheels for turbomachine application to allowable small thicknesses while still maintaining the wheel in a flat condition.

It is also known to fabricate wheels by various types of roll forming machines. Some of these machines use opposing pairs of rolls to form the wheel from a blank. Although these previous rolling machines produce wheels from blanks that are satisfactory for some applications without the requirement of being flat, such as automobile wheels, they have not been successful in rolling a finished, thin, flat, contoured wheel satisfactory for use in aircraft gas turbines. The present practice for forming wheels is to form wheel blanks and then finish machine them to finish dimensions.

Other methods of forming wheels have used (1) opposing pairs of rolls which extend partially radially on the blank, or, (2) opposing pairs of rolls in which one roll is sufficiently long to cover the whole radial dimension of one side of the blank and the other roll covers a portion of the radial dimension of the other side, or (3) a plurality of rolls spaced angularly and radially on one side of the blank, and a die on the other side of the wheel against which the wheel is worked so that the rolls can make the metal flow into cavities in the die, or (4) a pair of rolls to form the web and another pair of rolls to form the rim from a smooth or flat piece of metal or (5) pulling the rim radially in tension with a plurality of rolls either hot or cold.

The above methods fail to control the flow of the metal in such a manner as to produce finished thin, flat, contoured wheels. The difficulties encountered by each of the above methods are respectively as follows: (1) a large portion of the blank remains untouched during several revolutions resulting in dishing, (2 and 3) uneven stresses caused by the non-uniform flow of metal on one side as compared to the other side resulting in dishing, (4) the rim would split before the web is reduced to its final dimensions since the web would grow faster than the rim, (5) tests have shown that cold roll forming by pulling in tension can only permit approximately 20% reduction without splitting which is insufficient for making thin wheels. Also, forming by a hot process in tension, or compression, results in hardening of the web since the thin web can not retain the heat. This causes the wheel to lose its plasticity so that upon further stretching the wheel will crack. In addition, hot forming causes oxides which later must be removed.

The inadequacies of the prior methods described above are only illustrative and not intended to be all inclusive, recognizing that there are many other ways for roll forming wheels. However, each of these prior methods have failed to provide a way for forming finished, thin, flat, contoured wheels to the allowable designed dimensions for use in compressors and turbines in aircraft gas turbines. The above methods have failed to control the compressive forces generated by the rolls so as to obtain a spiral flow of metal and result in a flat wheel.

For purposes of this invention a contoured wheel is intended to cover a wheel having portions of different thicknesses, for example, a wheel having a hub of one thickness, a web of a different thickness and a rim of a still different thickness. Also, a flat wheel is intended to cover a wheel which is not dished during forming, that is, maintaining a plane through the hub, web, and rim at the same angle to the axis of the finished wheel as it was in the original blank. The elastic limit is intended to cover the maximum stress that a material will withstand without permanent deformation.

Uniform proportional radial growth of a blank is intended to cover the proportional amount of reduction in thickness of one radial location with respect to a different radial location in order to obtain uniform radial growth of the blank so as to maintain it in a flat condition. In other words, the circumferential growth or $\pi$ relationships must be taken into account since the greater the radial distance of the portion that is being worked, the more flow of metal will take place in a circumferential direction. Further, cold rolling is intended to cover rolling the material under conditions in which the material is worked while in a plastic state either cold, warm or at room temperatures.

It is therefore a general object of this invention to provide a machine for forming wheels which will result in a finished thin, flat, contoured wheel to a thickness which could not be achieved by prior known machines.

It is an object of this invention to cold roll a finished thin, flat, contoured wheel by coordinating the reduction in thickness of various portions of a wheel blank with the rate of radial growth of each such portion so as to avoid buckling or splitting of the blank.

It is another object of this invention to form a thin flat contoured wheel by cold rolling rather than hot rolling, since during the hot rolling process the thin web section of the wheel can not retain the heat sufficiently long for the forming process, thereby requiring continued reheating which results in hardening of the wheel while being formed and allows oxides to form which later must be removed.

It is still another object of this invention to form a thin flat contoured wheel by simultaneously compressing all radial portions during each revolution of the wheel blank according to a predetermined schedule so as to control the radial growth of one portion with respect to another portion, the wheel being compressed beyond the elastic limit of the metal.

It is a further object of this invention to apply compressive forces to a contoured blank having a hub, web, and rim, which forces are directed perpendicular to the centerline of the blank passing through the hub and rim so that the flow of metal is tangential to the point or points on the blank at which the compressive force is applied and simultaneously reducing the thickness of the web and rim at a programmed rate so that the radial growth of the blank is controlled to result in a flat wheel.

It is another further object of this invention to form a thin, flat, contoured wheel from a non-uniform preformed blank by cold rolling, and providing uniform proportional radial growth to all non-uniform portions of the blank.

It is a still further object of this invention to provide a machine for cold forming a finished, thin, flat contoured wheel by a plurality of pairs of rolls, the pairs of rolls being simultaneously actuated from a common signal source, and the movement of the pairs of rolls being programmed with respect to each other by thickness control means and radial growth means so that the radial growth of the rim is made to grow as fast or slightly faster than the web.

Briefly stated, and in accordance with one aspect of this invention, a machine is provided for forming a thin, flat, contoured wheel from a preformed contoured blank, the blank having different thicknesses (hub, web, and rim), all portions of the blank being simultaneously compressed beyond the elastic limit of the material during each revolution of the wheel at a controlled or programmed rate so that the stresses between the various portions is very low to maintain the flatness even though the total reduction of the metal is high.

The subject matter which we regard as our invention is particularly pointed out and distinctly claimed in the concluding portion of this specification. Our invention, however both as to organization and method of operation together with further objects and advantages thereof, may best be understood by reference to the following description taken in connection with the accompanying drawings in which—

FIGURE 1 is a cross sectional view of a finished, thin, flat, contoured wheel having different thicknesses;

FIGURE 2 is a cross sectional view of a preformed blank having different thicknesses;

FIGURE 3 shows a blank with three pairs of rolls with their paths of travel being in overlapping relation to each other, one pair being positioned at the hub, one pair being positioned on the web to follow the radial growth of the rim, and one pair on the rim;

FIGURE 4 shows the growth curves for each pair of rolls to follow so that they can form the wheel according to a programmed rate or predetermined schedule; and FIGURE 5 is a schematic view of one means for mechanically coordinating a plurality of pairs of rolls to follow the growth curves so as to form a thin flat contoured wheel.

This invention contemplates placing a contoured wheel blank under compression by providing a plurality of pairs of opposing rolls, with the rolls of each pair being on opposite sides of the wheel blank so as to be capable of applying pressure against one another. The number of pairs of rolls used for forming the final desired shape wheel will depend on such items as the size of the wheel, the material of which it is made, the desirable fabrication speed used for forming the wheel, and whether the final desired shape requires different shaped rolls. However, in each case, the contoured wheel is simultaneously compressed at a controlled rate in which the rate of reduction of one portion of the wheel will not cause splitting or buckling due to the improper programming of the rate of reduction in thickness of another portion of the wheel. For purposes of explaining a preferred embodiment of the invention, three pairs of opposing rolls are provided for forming the wheel as shown in FIGURE 3. However, it is recognized that additional pairs of rolls could be used for purposes of speeding up the fabrication.

In order to maintain the preformed contoured blank flat while reducing it to a relatively thin thickness, it is necessary that the reduction take place at a controlled rate so as to have a uniform proportional radial growth. Reference is made to FIGURES 2 and 4 in which the wheel blank shown is programmed in that the rate of reduction of thickness with respect to the rate of radial growth at a particular point on the wheel is programmed for each revolution of the wheel. Since the web of the wheel is thinner than the rim of the wheel, the radial growth of the web must be controlled with respect to the radial growth of the rim for if the web grows faster than the rim it will crack. Also, if the rim grows faster than the web it will buckle. In other words, the growth of the rim is scheduled to grow radially as fast or slightly faster than the web. Therefore, the rate of reduction of thickness and the radial growth of the web, and also of the rim, must be programmed with respect to each other so as to maintain the wheel in a flat condition. This is accomplished by calculating the growth as follows—

Since the volume of material remains nearly constant throughout the complete rolling operation the dimensions for the preformed blank are calculated from the finished designed wheel. Assuming the volume of the finished wheel is the same as the volume of material in the preformed blank, the dimensions of the blank can be determined. This is obtained mathematically by calculating the volume of each principal section (hub, web, and rim) using Guldinus' rule. The Guildinus' rule is, the volume of a uniform solid body formed by the revolution of a cross-sectional surface about an axis equals the area of the cross-sectional surface multiplied by the length of the path of travel of its center of gravity. In formula form this can be designated as follows:

$V = A \times \pi \times D_{c.g.}$ where
$A$ = Area of the cross-sectional area
$\pi \times D_{c.g.}$ = circumference formed by the path of the center of gravity (c.g.)

The meaning of center of gravity for purposes of this invention is the center of gravity of the cross-sectional area of the body to determine its volume and does not mean center of gravity of the mass of the body. Therefore, the center of gravity of a rectangular cross-section of a body would be at its center.

Referring to FIGURE 1, it is assumed that the finished wheel has the following dimensions:

| | |
|---|---|
| $D_h$ = diameter of hub | 5.270" |
| $T_h$ = thickness of hub | .440" |
| $D_w$ = diameter of hub and web | 22.400" |
| $T_w$ = thickness of web | .066" |
| $L_w$ = width of web | 4.750" |
| $L_r$ = width of rim | 1.530" |
| $T_r$ = thickness of rim | .450" |
| $F$ = radius of fillets at hub and rim | .300" |

The web section for the preformed blank and the rim section for the preformed blank are then calculated separately. For simplicity of explaining the invention the fillets are excluded from the calculations although in practice this would be required to be included in the calculations. The volume of the web section minus the fillets is calculated as follows:

$V_{wp} = V_w - V_f$ where
$V_{wp}$ = Volume of the preformed web
$V_w$ = Volume of the finished web
$V_f$ = Volume of the finished fillets Since Guldinus' rule as noted above is:

$V_w = A \times \pi \times D_{c.g.f.w.} = T_w \times L_w \times \pi \times D_{c.g.f.w.}$ where
$T_w$ = thickness of finished web
$L_w$ = width of finished web
$\pi \times D_{c.g.f.w.}$ = circumference formed by the path of the center of gravity of the finished web
$V_w = 0.66 \times 17.130 \times 3.14 \times 8.565 = 27.95$ cu. in.

In order to find the volume of the fillets the following formula is used:

$A_{fH} = 2(K \times r^2)$ where:
$A_{fH}$ = area of fillets at hub
$K$ = constant = .215
$r$ = radius of fillet Since there are two fillets at the hub, it is multiplied by two.

$V_{fH} = A_{fH} \times \pi \times D_{c.g.f.h} = 2(K \times r^2) \times \pi \times D_{c.g.f.h}$
c.g.f.h = $K \times r$ where
c.g.f.h = center of gravity of fillets at the hub
$K$ = constant = .215
$r$ = radius of fillet
c.g.f.H = $.22 \times .3 = .066$
Diameter of c.g.f.H = $5.27 \times 2(.066) = 5.402$ Therefore $V_{fH} = 2 \times .215 \times .3^2 \times 3.14 \times 5.402 = .656$ cu. in.
$A_{fr} = 2(K \times r^2)$ where
$A_{fr}$ = Area of fillets at rim
$K$ = constant = .215
$r$ = radius of fillet Since there are two fillets at the rim, the quantity $K \times r^2$ is multiplied by two.

In order to find the volume of the rim and using Guldinus' rule:

$V_{fr} = A_{fr} \times \pi \times D_{c.g.f.r.} = 2(K \times r^2) \times \pi \times D_{c.g.f.r.}$
c.g.f.r. = $K \times r$ where
$K$ = constant = .215
$r$ = radius of fillet
c.g.f.r. = center of gravity of rim fillets
c.g.f.r. = $.215 \times .3 = .066$
Diameter of c.g.f.r. = $14.77 - 2(.066) = 14.638$ Therefore:

$V_{fr} = 2 \times .215 \times .3^2 \times 3.14 \times 14.638 = 1.78$

Since $V_f = V_{fh} \times V_{fr}$
$V_f = .656 \times 1.78 = 2.44$ cu. in.

Therefore, $V_{wp} = 27.95 - 2.44 = 25.51$ cu. in.

Since the hub section is not cold worked, its size and shape will remain unchanged. Therefore, there remains only the procedure for calculating the two remaining sections, the web and rim.

Having found $V_{wp}$ (volume of the preformed web), and again using Guldinus' rule, the thickness of the preformed web can now be found since the volume for the finished web is the same for the preformed web.

$$t_{wp} = \frac{V_{wp}}{\pi \times D_{c.g.} \times L_{wp}}$$

where:

$t_{wp}$ = thickness of the preformed web
$V_{wp}$ = volume of the preformed web
$\pi D_{c.g.}$ = circumference formed by the path of the center of gravity of the preformed web
$L_{wp}$ = width of the preformed web The width of the preformed web is determined by the number of rolls used on the web. Assuming one pair of rolls is positioned at the hub and another pair is positioned to follow the rim radially outwardly, then the two pairs of rolls should be angularly and radially positioned so that when the web is completely formed one marginal edge of their paths barely overlap. Since each roll takes up half the length of the finished web ($L_w$), the length of each roll is half of 8.565 in. or 4.288 in. Therefore, the smallest width that the web of the preformed web can be is 4.288 in. However, since it is desirable for the path of the rolls to have some overlap of approximately one inch, when the wheel is finished, the width of each roll is selected at 4.750. This dimension establishes the diameter of the c.g. for the preformed web at 10.02 inches as shown in FIGURE 2. Therefore, applying the appropriate values to the formula we have:

$$T_{wp} = \frac{25.51}{(3.14)(10.02)(4.75)} = .171 \text{ inches}$$

Increasing the diameter in one inch increments and substituting in the above formula, the following thicknesses of the web are obtained:

| Diameter: | Thickness |
|---|---|
| 10.02 | .171 |
| 11.02 | .146 |
| 12.02 | .127 |
| 14.02 | .098 |
| 15.02 | .087 |
| 17.02 | .070 |
| 17.79 | .066 |

Applying these points to the graph shown in FIGURE 4, the curve $y$ is obtained for the pair of rolls on the web which follow the rim radially outwardly.

Since the rolls 18 at the hub do not move radially outwardly, their position does not change radially. Therefore, the curve $x$ for the hub rolls is a straight vertical line. The hub rolls 18 reduce the web in thickness the same amount as the curves dictate for the web rolls 20 for each increment increase in diameter.

The volume of the preformed rim section is then calculated as follows:

$$V_{rp} = V_r$$

where $V_{rp}$ = volume of the preformed rim
$V_r$ = volume of the finished rim

Also applying Guldinus' rule, we have:

$V_r = .450 \times 1.530 \times 23.165 \times 3.141$
$V_r = 51.76$ cu. in. = $V_{rp}$ Therefore, the thickness of the preformed rim can be found as follows:

$$t_{rp} = \frac{V_{rp}}{\pi \times D_{c.g.r.p.} \times L_{rp}}$$

Where $t_{rp}$ = thickness of preformed rim
$V_{rp}$ = volume of preformed rim
$\pi D_{c.g.r.p.}$ = circumference formed by the path of the center of gravity of the preformed rim
$L_{rp}$ = width of preformed rim
$L_r$ is the same for both the finished wheel and the preformed blank so that $$L_{rp} = L_r$$

Therefore:

$$t_{rp} = \frac{51.76}{3.14 \times 16.300 \times 1.530} = .661 \text{ inches}$$

Increasing the diameter in one inch increments and substituting in the above formula the following reduction in thickness with corresponding increases in diameter are obtained:

| Diameter: | Thickness |
|---|---|
| 16.30 | .660 |
| 17.30 | .622 |
| 18.30 | .588 |
| 20.30 | .530 |
| 21.30 | .506 |
| 22.30 | .462 |
| 23.93 | .450 |

These points are plotted on the graph in FIGURE 4 to give the curve ($z$) for the rim rolls 22.

Referring to FIGURE 4, it is seen that for each increment increase in diameter, the web and rim will have a corresponding decrease in thickness. The curves are an indication of how the wheel should grow in order to retain its flat condition.

The rolls are preferred to be cone shaped so as to more nearly approach the speed of the blank so as to maintain slippage between the rolls and blank at a minimum. However, cylindrical rolls could also be used. Further the rim rolls 22 could be a cylinder and sufficiently long so as not to have a radial traverse. In other words the blank would grow radially outwardly without a corresponding radial movement of the rim rolls. The rim rolls would then follow the vertical growth curve $z'$, as shown in FIGURE 4. The rim would then be decreased in thickness at a rate depending upon the requirements of curve $z$.

If it is desirable from an engineering design standpoint in order to still further reduce the weight of the finished wheel, to have a finished wheel with a tapered web, or tapered rim or both, Guldinus' rule can still be applied to calculate the volumes and thicknesses. The calculations for locating the center of gravity of a trapezoid (tapered) cross-section instead of a rectangular cross-section are carried out by applying the well known geometrical formulas for this purpose.

There are several ways of coordinating the pairs of rolls so as to follow the growth curves given in FIGURE 4, and thereby form a finished, flat, thin, contoured wheel. One way that this can be accomplished is by a programming means for actuating each pair of rolls in response to a cam or to a variable potentiometer which are designed according to the growth curves to produce signals which can be hydraulically amplified to actuate the rolls accordingly. Other programming means for actuating the rolls can be substituted without departing from this invention. In order to show a preferred embodiment of the invention, cam arrangements in combination with variable potentiometers and variable motors are disclosed. These and other variable means can be combined in many different ways to actuate the rolls according to the predetermined growth curves. One such way will now be described.

Referring now to FIGURE 5, a schematic arrangement is shown in which three pairs of opposing rolls are so positioned on the contoured wheel blank, and with the pairs of rolls so interconnected as to reduce the thickness of the wheel substantially simultaneously at a controlled rate which is a function of a common speed signal. In order to carry this out a wheel blank 10 is shown securely held between retractable jaws of a clutch 12. The jaws of the clutch 12 are fixed to a spindle 14 which in turn is connected to the motor 16. The motor 16 is reversible and is provided with a reversible switch 17 to thereby actuate the spindle in either direction. The jaws of the clutch are made retractable so as to enable one to insert and remove the wheel blank. This can be accomplished in any well known manner and forms no part of this invention.

In carrying out the preferred embodiment of the invention, one pair of hub rolls 18 is placed at the hub of the wheel for forming the web near the hub. Another pair of web rolls 20 is placed on the web so as to work the web adjacent to the rim. A third pair of rim rolls 22 is placed on the rim and only works on the rim. The hub rolls 18 always remain at the hub during the forming of the wheel, while the web rolls 20 and rim rolls 22 travel radially outwardly with the reduction in thickness of the wheel since the wheel will tend to grow. Therefore, the hub rolls will not be subject to as many of the parameters as the rim rolls and web rolls. For example, the hub rolls will have as its variable parameter the rate of reduction of thickness of the hub, whereas, the rim and web rolls will not only have as a variable the rate of reduction in thickness as a parameter but also radial traverse which will be accompanied by change in speed of the rolls. In other words, the only variable in the hub rolls is the compressive force being applied to the blank where the other sets of rolls have speed and radial location as well as the compressive force as variables. These parameters are all coordinated to a predetermined schedule as a function of the speed of the motor 16 and of the spindle 14. In other words, each pair of rolls is connected to a common signal, with each pair of rolls being provided with programming means between the source of the signal and the rolls for transforming the signal into the proper amount of compressive force of the opposing rolls, the radial traverse of each pair of opposing rolls and their speed according to the growth curves. Although the common signal for actuating the pairs of opposing rolls is taken from the spindle the signal can be taken from any one of the motors used in rotating each pair of rolls. Such an arrangement will provide the elimination of the motor 16. In such a case one of the roll motors would then be used to give the speed signal to which all of the other rolls would be coordinated as a function thereof.

Referring now to the hub rolls 18 a thickness control means is provided for controlling the manner in which the hub rolls are coordinated with the signal received from the spindle 14. A hub driving gear is provided as shown at 24. This hub driving gear 24 is in meshed engagement with a driven gear 26 which is mounted in a gear box 28. A gear train (not shown) in the gear box 28 is of predetermined dimension so as to provide a predetermined rotational movement to a screw or worm 30. A bed or platform 32 is threadedly mounted on the work 30 so as to move in an axial direction upon rotational movement of the screw or worm 30. In other words, the rotational movement of the worm is transformed into a translational movement of the slidable bed 32. The threads of the worm are dimensioned so as to give a predetermined translational movement to the bed 32. The bed is constrained to have only translational movement. A cam 34 is shown fixedly mounted on the bed 32 so as to be translated along with the slidable bed. This cam 34 is designed to have a particular curvature according to the growth curve for the hub rolls 18 so as to give the desirable roll pressure signal as a function of the speed of the spindle 14. Therefore, the gear train in the gear box 28, the threads on the worm or screw 30 and the cam 34 are dimensioned in such a manner as to give the proper pressure signal to the rolls 18 as a function of the speed of the spindle 14. These dimensions are such as to enable the rolls 18 to follow the growth curves provided for the wheel in FIGURE 4. A particular point on the cam represents a predetermined pressure signal at a predetermined time after the starting of the forming process. This particular point will represent a point on the curve that has been plotted in FIGURE 4 for the particular contoured wheel described above which would maintain the wheel in a flat condition. Now, the cam 34 is engaged by a follower or piston rod 36 which is spring biased against the cam. The follower is connected to a tracer head 38 which contains tracer mechanism, the details of which are not shown since it forms no part of this invention. The tracer mechanism is connected to a hydraulic piston and cylinder arrangement 52 by conduits 54 and 56. The piston 57 forms two chambers in the cylinder 52.

Conduit 54 is connected to one side of the piston 57 and the conduit 56 is connected to the other side of the piston 57 in such a manner that one conduit is supplying fluid to one chamber under pressure to move the piston so as to force fluid out of the other chamber so as to exhaust the fluid back to the pilot valves and then to the fluid supply source. The piston 57 and piston rod 58 is thereby controlled by the hydraulic pressure resulting from the operation of the tracer head 38, which of course is responsive to the position of the follower 36. The piston rod 58 is connected to a toggle link arrangement 60 which is in turn connected to the pair of rolls 18 in such a manner as to force the rolls either toward or away from each other depending upon the position of the piston rod 58. Since the piston rod 58 is responsive to the hydraulic pressure of fluid from the tracer head 38 which is a function of the speed of the spindle 14 and the growth curve $x$, the pressure exerted on the wheel blank by the rollers is also a function of the speed of the spindle 14 and the growth curve $x$. Although the piston rod 58 is shown connected to a toggle link arrangement for forcing the rolls 18 either toward or away from each other, other schemes may be used. However, for purposes of explanation of the invention, the rollers are shown schematically as being actuated by a toggle link arrangement.

Since the rolls 18 are not required to have a radial traverse, the speed of the rolls operating at a constant radial location will not be changed. In other words, since the rolls 18 are located at the hub, its speed does not vary in accordance with the radial growth. Therefore, a relay 62 is shown fixed to the gear box 28 so as to energize the speed motor 64. The motor 64 is in turn connected to the rolls 18 through the use of similar gears 66 so as to drive both the rolls 18 at the same speed. Also, the shafts 63 connecting the gears to the rolls, are provided with universal joints 65 to enable the rolls to move in a radial direction.

In order to place the rolls 18 at its proper location on the wheel blank to begin the rolling process, and also to move the rolls in the radial direction in order to remove and insert the wheel blank, the hydraulic cylinder and piston arrangement 52 and the motor 64 along with the rolls 18 are shown schematically mounted in a housing 67. Therefore, by moving the housing 67 in a radial direction the rolls 18 can be moved radially to permit the removal of the wheel blank. This is accomplished by providing a motor 68 with a pinion 70 adapted to engage a rack 72 mounted on the housing 67. A manual switch is shown at 74 for operating the motor in either of two directions so as to traverse the housing 67 and the rolls 18 in both radial directions.

Since the web rolls 20 differ from the operation of the hub rolls 18 in that the wab rolls 20 work on the web adjacent to the rim as it grows radially, they are subject to the variables of radial traverse and speed in addition to the change in compressive force exerted on the wheel blank. These variables are shown as operating as a function of the same speed signal taken from the spindle 14 as in the case of the rolls 18 in addition to a radial growth means.

In order to actuate the rolls 20 in response to the speed signal taken from the spindle 14, so as to transform the signal into the variable signals of radial traverse and compressive force exerted by the rolls, as well as a change in speed of the rolls, a thickness control means and radial growth means is provided. The thickness control means includes the web driving gear 124 which actuates a web driven gear 126. The speed signal received by the web driven gear 126 is transmitted into a gear train (not shown) in the gear box 128. The resultant signal from the gear box 128 drives a worm gear 130 which is threadedly mounted in a slidable bed 132. The slidable bed is constrained to have translational movement. The slidable bed 132 has a cam 134 fixedly mounted thereon. The cam 134 is designed in such a manner as to give a programmed compressive force to the rolls 20 with relation to the radial transverse and speed of the rolls 20 as determined by the growth curves, all being related as a function of the speed signal taken from the spindle 14. As pointed out previously, the particular compressive force is determined by designing the cam to represent the particular growth curve ($y$).

The compressive force signal that is to be exerted by the rolls 20 is taken from the cam 134 by a spring biased (not shown) follower 136. The follower 136 is mounted in a tracer head 138 containing tracer mechanism (not shown). The tracer head 138 is connected to a hydraulic piston and cylinder arrangement 152 by conduits 154 and 156. The pressure signal received by the tracer head and delivered to the piston and cylinder arrangement 152 is transmitted to the piston rod 158. The movement of the piston rod 158 transmits the compressive force to the rolls 20 through a toggle link arrangement 160. Although a toggle link arrangement has been shown for urging the rolls toward and away from each other, as noted above, other means can also be used.

Since the wheel blank will grow radially as it is being formed, and the rolls 20 must nest between the web and rim as shown in FIGURE 3, provision is made for coordinating the radial traverse of the rolls 20 with the reduction in thickness of the wheel blank which are a function of the common speed signal from the spindle 14 by including a radial growth control means. The position of radial traverse is determined by the position of the bed plate 132 and the potentiometer 162 mounted thereon. A pickoff is shown at 161 on the potentiometer and connected to the traverse motor 168.

The pickoff 161 actuates the speed motor 164. Since the rolls 20 must operate at the same speed, similar gears are shown 166 for driving the rolls 20.

The rolls 20, along with the hydraulic piston and cylinder 152 and the speed motor 164 are mounted in a common housing 167. In order to traverse the rolls 20 in a radial direction as a function of the speed signal received from the spindle 14 to give the desirable radial position of the rolls 20 with respect to the rate of reduction of the thickness of the wheel, the housing 167 is actuated as a result of being driven by the traverse motor 168 and pickoff 161.

In order to position the rolls 20 at a correct location on the wheel blank, a reversible switch is shown at 174.

Referring now to the rim rolls 22 they are actuated in accordance with the rate of reduction in thickness of the wheel blank rim, the radial traverse and the speed as a function of the radial growth of the wheel blank. In order to coordinate these various parameters, thickness control means and radial growth control means are provided for the wheel rolls 22 so as to be responsive to a common signal source, which is the speed of the spindle 14, through a rim driving gear 224. The thickness control means includes the rim driving gear 226 connected to a gear box 228. The gear box 228 contains gearing mechanism (not shown) properly dimensioned to give a desirable rotational speed to a worm gear 230. The worm gear 230 is threadedly mounted in a slidable bed plate 232 which is constrained so as to move in a translatory direction.

In order to apply the correct compressive force to the rolls 22, according to the growth curve $z$ which will retain the rim in a flat condition without buckling of the web, a cam 234 is fixed to the bed plate 232. The cam 234 is dimensioned in such a manner as to give the proper signal as determined from the growth curve $z$ in FIGURE 4, to provide the correct compressive force to the rolls 22 at the particular radial position on the rim. This is carried out by providing a follower 236 adapted to engage the cam surface on the cam 234, which follower 236 is spring biased (not shown) as are the other followers 36 and 136 so as to be in engagement with the cam surface at all times. The follower 236 is connected to a tracer head 238 which contains a tracer mechanism for translating the signal received by the follower into a particular pressure head. This pressure head is transmitted to a piston and cylinder arrangement 252 through conduits 254 and 256. The piston and cylinder arrangement 252 contains a piston 257 responsive to the pressure head received from the tracer mechanism 38. The position of the piston 257 corresponds to a signal which represents the pressure to be exerted by the rollers 22 on the wheel rim. This signal is transmitted to rolls 22 by connecting the piston rod 258 to a toggle link arrangement 260. The rolls are mounted on the toggle link arrangement in such a manner so as to urge the rolls 22 either toward or away from each other. A universal connection 265 is provided in each of the drive shafts 263 of the rolls to enable to move either toward or away from each other.

Since the speed of the rolls 22 must change with a change in position of radial traverse, a pickoff is shown at 261 on a potentiometer mounted on the bed plate 232, the position of which provides a signal for the pickoff for actuating the speed motor 264. The speed motor in turn actuates the rolls 22 at the same speed through a pair of like gears 266. The gears are connected to the rolls through the drive shafts 263. Therefore, the position of the bed plate 232 also gives a speed signal for the rolls 22 which speed is related to the compressive force and radial position of the rolls 22 on the rim so as to follow the growth curves.

In order to traverse the rolls 22 in a radial direction on the wheel blank, radial growth control means is provided which includes the hydraulic piston cylinder arrangement 252 and the speed motor 264 mounted in a common housing 267. To provide the proper radial traverse as a function of the compressive force exerted by the rolls 22 taken from the common signal from the spindle 14, the pickoff 261 actuates a traverse motor 268. The traverse motor 268 drives a pinion 270 for driving a rack 272 mounted on the housing 267. Therefore, the rolls 22 are given a radial position which corresponds to the position of the pickoff 261 on the potentiometer 262 which is a function of the common speed signal taken from the spindle 14 so as to follow the growth curves.

The manner of carrying out the forming of a thin flat contoured wheel is initiated by placing a preformed wheel, which is shown in FIGURE 2 and is similar in shape to the finished design, between the jaws of the clutch 12. The hub rolls 18 are positioned at the hub of the wheel by actuating the reversible switch 74 to energize the motor 68 and the rack and pinion 72 and 70 which traverses the housing 67 carrying the rollers. Similarly, the traverse motor 168 actuates the housing 167 to properly locate the web rolls 20. This is accomplished by actuating a reversible switch 174. Similarly, the rolls 22 are placed on the rim of the wheel blank 10. This is accomplished by energizing the traverse motor 268 through the reversible switch 274 and thereby actuating the housing 267 and rolls 22 through the pinion 270 and rack 272 fixed to the housing.

After having positioned the rolls at their correct radial position, the motor 16 is then energized to actuate the spindle 14 so as to drive the gear box 28 and actuate the worm 30 and thereby position the bed plate and cam 34 at the starting position. This starting position should be at a point where the rolls 18 engage the surface of the wheel blank as shown by the growth curve in FIGURE 4. Similarly, the web rolls 20 are made to engage the web of the wheel blank 10 by energizing or actuating the web gear 126 and the gear mechanism in the gear box 126, so as to actuate the worm 130 and thereby position the bed plate and cam 134 at its initial starting position. The follower 136 should actuate the tracer mechanism 138 so as to position the piston 158 and thereby position the rolls 20 on the web. The web or the rolls 20 should be just contacting the web of the wheel as shown by the growth curve y in FIGURE 4. Similarly, the position of the potentiometer 162 is such as to give the correct speed to the web rolls 20 at its particular radial location. This is also its starting or initial position. The rolls 22 are positioned on the rim of the wheel blank 10 in the same manner in that the rolls 20 are positioned by actuating the bed plate 232 through rim driven gear 226, gear train in gear box 228 and the worm 230 so as to locate the cam 234 at its initial starting position. The correct signal is then picked up by the follower 236 and transmitted through the tracer mechanism 238 to the hydraulic cylinder 252. This positions the piston rod 258 so as to apply the correct compressive force to the rolls 22 which at its initial position should just make contact with the rim of the wheel blank 10 as shown by the growth curve z in FIGURE 4. Also, the pickoff 261 should also be at its initial or starting position on the potentiometer 262 so as to energize the motor 264 to give the desired speed of rotation to the rolls 22 for their particular radial position.

With the rolls now at their starting position, it is recognized that various means can be provided for correcting inherent mechanical errors in properly locating the rolls as well as setting the speed of the rolls as for example when one pair of rolls is not in contact at the initial or starting position or when one pair of rolls is not actuating at the proper speed. This means can be provided in any well known manner and which forms no part of this invention.

Since each pair of rolls is connected to a common speed signal from spindle 14, this provides the means of coordinating each pair of rolls in accordance with the various parameters. This coordination is provided for the pair of rolls 18 by the thickness control means which include the gearing mechanism in the gear box 28, the worm 30 along with the cam 34 as determined by the growth curve x. Also, for the rolls 20, provision is made for coordinating the compressive force, speed and radial traverse by a thickness control means and a radial growth control means which includes gears in the gear box 128, threads on the worm 130, and the shape of the cam 134 in addition to the potentiometer 162 as determined by the growth curve y. Similarly, the compressive force, speed of rotation, and radial location of the rolls 22 are coordinated through the thickness control means and radial growth means by proper dimensioning of the gears in the gear box 228, the worm 230, and the shape of the cam 234 as determined from the growth curve z. Since each of these parameters for each of the pairs of rolls are all coordinated with the common speed signal taken from the spindle 14, each of the pairs of rolls are actuated in a particular manner in order to reduce the thickness of the contoured wheel at a particular rate in proportion to its radial growth, so as not to permit the rim to grow too rapidly with respect to the web and thereby split, or to permit the web to grow too rapidly with respect to the rim so as to buckle the web. In order words, the pairs of rolls are programmed at a controlled rate so as to permit the rim to grow as fast or slightly faster than the web and simultaneously compress the blank to produce a thin, flat, contoured wheel.

It is apparent that all three pairs of rolls are responsive to the same speed signal but due to different functional requirements to form a thin flat contoured wheel, the web and rim rollers require potentiometers and cams designed to give different movements than that required for the hub rollers as required by their respective growth curve.

An element contributing to the large expense involved in the construction of an aircraft gas turbine comes from the high cost of fabricating wheels by previously known methods. This method and machine for forming a thin, flat, contoured wheel enables inexpensive fabrication of wheel blanks in large quantities.

As a result of use of the above machine for forming wheels, a flat thin contoured wheel having improved physical properties can be made to a small dimension which has heretofore been impossible by prior fabrication methods, and which small dimension is sufficient to withstand the loads placed upon the wheel. This cold rolling machine produces a lighter wheel having an improved finish and grain structure and in a tremendous weight saving to the overall weight of the aircraft gas turbine engine which is a problem continuously plaguing a designer for aircraft gas turbines.

Although a particular embodiment of the invention has been illustrated and described, it will be obvious to those skilled in the art that various changes and modifications can be made without departing from the invention, and it is intended to cover in the appended claims all such changes and modifications that come within the true spirit and scope of the invention.

What we claim as new and desire to secure by Letters Patent of the United States is:

1. A machine for cold roll forming a finished, thin, flat, contoured wheel from a blank having a hub, web, and rim of different thicknesses, a support, a plurality of pairs of opposing rolls mounted on the support, the pairs of rolls being radially and angularly positioned on the blank so that their pressure over paths of contact with the wheel blank surface stress at all times during forming at least a part of each circular radial portion of the blank surface concentric with the axial center of the blank, a common signal source for simultaneously actuating the pairs of rolls, programming means for each pair of rolls responsive to the common signal source for actuating each pair of rolls according to a schedule predetermined for each pair of rolls according to growth characteristics of the blank, the programming means including thickness positioning means for positioning each pair of rolls transversely of the wheel blank according to the predetermined schedule, and radial positioning means for positioning at least several of the pairs of rolls at appropriate radial positions according to the predetermined schedule.

2. A wheel rolling machine for forming finished, thin, flat, contoured wheels comprising rotatable support means for supporting a blank, roll support means mounted independently of the rotatable support means, a plurality of pairs of rolls adjustably mounted on the roll support means, the pairs of rolls positioned at different radial and angular positions on the wheel blank, the pressure over paths of contact of the pairs of rolls with the blank surface stressing at all times during forming at least a part of each circular, radial portion of the blank surface concentric with the axial center of the blank, thickness control means for each pair of rolls, radial positioning means for at least one pair of the rolls, each of the thickness control means and the radial positioning means including programming means scheduled according to growth characteristics predetermined for the blank, a common signal source for actuating the thickness positioning means and radial positioning means with respect to each other so that each of the pairs of rolls are operated according to a predetermined schedule so as to reduce the various portions of the blank according to the schedule and thereby result in a flat wheel.

3. A machine for forming a thin, flat contoured wheel from a preformed blank including a hub, a web and a rim, the web being located between the hub and the rim and having an axial thickness different from that of the hub and the rim, comprising: a support; a plurality of pairs of opposing rolls adjustably mounted in the support and disposed on opposing surfaces of the blank when the machine is in roll forming position; force means to apply a force through the rolls to the blank; axial and radial roll movement means; coordinated programming means for programming the direction and rate of movement of each of pairs of opposing rolls according to a schedule predetermined for each pair of rolls according to the growth characteristics of the blank; a first pair of the plurality of pairs of opposing rolls positioned during roll forming of the blank at the hub and separately programmed for movement axially with respect to the blank during rolling, a second pair of the plurality of pairs of opposing rolls positioned during roll forming of the blank at the rim and separately programmed for movement both axially and radially with respect to he blank to follow the movement of the rim, and at least one intermediate pair of the plurality of pairs of opposing rolls positioned during roll forming of the blank on the web and separately programmed for movement both axially and radially with respect to the blank, the plurality of pairs of opposing rolls disposed on the blank to stress during the roll forming operation at least a part of each circular, radial portion of the blank surface concentric with the axial center of the blank whereby uniform proportional radial growth occurs in the blank with even stress distribution during and after roll forming.

4. A machine for forming a thin, flat contoured wheel from a preformed blank including a hub, a web and a rim, the web being located between the hub and the rim and having an axial thickness different from that of the hub and the rim comprising: a support; a plurality of pairs of opposing rolls adjustably mounted in the support and disposed on opposing surfaces of the blank when the machine is in roll forming position; a first pair of the plurality of pairs of opposing rolls positioned during roll forming of the blank at the hub; first roll movement means for moving the first pair of rolls one toward the other; a second pair of the plurality of pairs of opposing rolls positioned during roll forming of the blank at the rim; second roll movement means for moving the second pair of rolls one toward the other and for moving the second pair of rolls radially with respect to the blank to follow the movement of the rim; at least one intermediate pair of the plurality of pairs of opposing rolls positioned during roll forming of the blank on the web; third roll movement means for moving the intermediate pairs of opposing rolls one of a pair toward the other and for moving each intermediate pair of rolls radially with respect to the blank; signal means to transmit a signal to each programming means as a function of rotation of the wheel during roll forming; programming means for each pair of opposing rolls scheduled according to predetermined growth characteristics of the blank and actuated by the signal means for separately controlling the first, second and third roll movement means; the plurality of pairs of opposing rolls disposed on the blank to stress during the roll forming operation at least a part of each circular, radial portion of the blank surface concentric with the axial center of the blank whereby uniform proportional radial growth occurs in the blank with even stress distribution during and after roll forming.

5. A machine for forming a thin, flat contoured wheel from a preformed blank including a hub, a web and a rim, the web being located between the hub and the rim and having an axial thickness different from that of the hub and the rim, comprising: a support; a plurality of pairs of opposing rolls adjustably mounted in the support and disposed on opposing surfaces of the blank when the machine is in roll forming position; signal means transmitting a signal according to the rate of rotation of the wheel during roll forming; a first pair of the plurality of pairs of opposing rolls positioned during roll forming of the blank at the hub; first roll movement means for moving the first pair of rolls one toward the other; first programming means scheduled according to predetermined growth characteristics of the portion of the blank to be worked by the first pair of opposing rolls, actuated according to the signal means and located between the signal means and the first roll movement means to control the movement of the first roll movement means; a second pair of the plurality of pairs of opposing rolls positioned during roll forming of the blank at the rim; second roll movement means for moving the second pair of rolls one toward the other and for moving the second pair of rolls radially with respect to the blank to follow the movement of the rim; second programming means scheduled according to predetermined growth characteristics of the portion of the blank to be worked by the second pair of opposing rolls, actuated according to the signal means and located between the signal means and the second roll movement means to control the movement of the second roll movement means; at least one intermediate pair of the plurality of pairs of opposing rolls positioned during roll forming of the blank on the web; third roll movement means for moving the intermediate pairs of opposing rolls one of a pair toward the other and for moving each intermediate pair of rolls radially with respect to the blank; third programming means scheduled according to predetermined growth characteristics of the portion of the blank to be worked by the intermediate pairs of opposing rolls, actuated according to the signal means and located between the signal means and the third roll movement means to control the movement of the third roll movement means; the plurality of pairs of opposing rolls disposed on the blank to stress during the roll forming operation at least a part of each circular, radial portion of the blank surface concentric with the axial center of the blank whereby uniform proportional radial growth occurs in the blank with even stress distribution during and after roll forming.

6. A machine for forming a thin, flat contoured wheel from a preformed blank including a hub, a web and a rim, the web being located between the hub and the rim and having an axial thickness different from that of the hub and the rim, comprising: a support; a plurality of pairs of opposing rolls adjustably mounted in the support and disposed on the opposing surfaces of the blank when the machine is in roll forming position; axial and radial roll movement means; programming means for each pair of opposing rolls, each programming means coordinated one with the other for programming the direction and rate of movement of each of the pairs of opposing rolls according to predetermined growth characteristics of the blank, each of said programming means including a radial growth control means to control the radial growth of the blank and a thickness control means programmed to signal roll movement means to vary the roll movement means as a function of thickness desired in the finished wheel after roll forming, the thickness control means and radial growth control means cooperating to control metal flow of at least a part of each circular, radial portion of the blank surface concentric with the axial center of the blank during roll forming both in the axial and radial directions; a first pair of the plurality of pairs of opposing rolls positioned during roll forming of the blank at the hub and programmed for movement axially with respect to the blank during rolling; a second pair of the plurality of pairs of opposing rolls positioned during roll forming of the blank at the rim and programmed for movement both axially and radially with respect to the blank to follow the movement of the rim; and at least one intermediate pair of the plurality of pairs of opposing rolls positioned during roll forming of the blank on the web and programmed for movement both axially and radially with respect to the blank.

References Cited in the file of this patent
UNITED STATES PATENTS

| | | |
|---|---|---|
| 956,780 | Von Philp | May 3, 1910 |
| 1,108,524 | Slick | Aug. 24, 1914 |
| 1,430,989 | Heisler | Oct. 3, 1922 |
| 1,897,645 | Swanson | Feb. 14, 1933 |
| 2,035,598 | Eckfeldt et al. | Mar. 31, 1936 |
| 2,280,783 | Bell et al. | Apr. 28, 1942 |
| 2,338,161 | Ashton | Jan. 4, 1944 |
| 2,588,651 | Nelson | Mar. 11, 1952 |
| 2,932,223 | Chartrand et al. | Apr. 12, 1960 |

FOREIGN PATENTS

| | | |
|---|---|---|
| 1,029 | Great Britain | Mar. 9, 1880 |